United States Patent [19]
Keskar et al.

[11] Patent Number: 6,106,591
[45] Date of Patent: Aug. 22, 2000

[54] PROCESS FOR REDUCING CARBON PRODUCTION IN SOLID ELECTROLYTE IONIC CONDUCTOR SYSTEMS

[75] Inventors: Nitin Ramesh Keskar, Grand Island; Ravi Prasad, East Amherst; Christian Friedrich Gottzmann, Clarence, all of N.Y.

[73] Assignee: Praxair Technology, Inc., Dunbury, Conn.

[21] Appl. No.: 09/185,959

[22] Filed: Nov. 5, 1998

Related U.S. Application Data

[63] Continuation-in-part of application No. 08/880,878, Jun. 23, 1997, Pat. No. 5,837,034.

[51] Int. Cl.$^7$ .................................................. B01D 53/22
[52] U.S. Cl. ............................ 95/54; 95/51; 95/236; 95/288
[58] Field of Search ............................. 95/45, 54, 288, 95/51, 139, 236; 96/4–14

[56] References Cited

U.S. PATENT DOCUMENTS

| | | | |
|---|---|---|---|
| Re. 34,595 | 5/1994 | Chen et al. .................................. | 95/54 |
| 4,386,944 | 6/1983 | Kimura ....................................... | 96/4 X |
| 4,732,583 | 3/1988 | DeLong et al. ............................. | 96/4 X |
| 4,791,079 | 12/1988 | Hazbun ....................................... | 502/4 |
| 5,084,073 | 1/1992 | Prasad ........................................ | 96/8 X |
| 5,108,464 | 4/1992 | Friesen et al. ............................. | 96/8 X |
| 5,205,842 | 4/1993 | Prasad ........................................ | 55/16 |
| 5,259,869 | 11/1993 | Auvil et al. ................................ | 96/10 X |
| 5,306,411 | 4/1994 | Mazanec et al. .......................... | 204/265 |
| 5,314,528 | 5/1994 | Monerau .................................... | 96/7 X |
| 5,378,263 | 1/1995 | Prasad ........................................ | 95/54 |
| 5,383,956 | 1/1995 | Prasad et al. ............................. | 96/9 X |
| 5,435,836 | 7/1995 | Anand et al. .............................. | 95/45 |
| 5,447,555 | 9/1995 | Yee et al. ................................... | 96/9 X |
| 5,447,559 | 9/1995 | Rao et al. .................................. | 96/7 X |
| 5,599,383 | 2/1997 | Dyer et al. ................................. | 96/8 |
| 5,820,655 | 10/1998 | Gottzmann et al. ....................... | 95/54 |
| 5,837,034 | 11/1998 | Keskar et al. ............................. | 95/54 |
| 5,837,125 | 11/1998 | Prasad et al. ............................. | 95/45 X |

OTHER PUBLICATIONS

Balachandran et al., "Dense Ceramic Membranes for Converting Methane to Syngas", First International Conference on Ceramic Membranes, 188$^{th}$ Meeting of the Electrochemical Society, Inc. (1995).

Nozaki et al., "Oxide Ion Transport for Selective Oxidative Coupling of Methane with New Membrane Reactor", AIChE Journal, vol. 40, No. 5 (1994) pp. 870–877.

Nagamoto et al., "Methane Oxidation by Oxygen Transported through Solid Electrolyte", Journal of Catalysis (1990) pp. 671–673.

*Primary Examiner*—Robert H. Spitzer
*Attorney, Agent, or Firm*—David M. Rosenblum

[57] ABSTRACT

A process for inhibiting the formation of carbon and/or coke from a carbon-containing reactive gas stream on the permeate side of an oxygen ion transport membrane, or for increasing the oxygen partial pressure thereon, by separating a feed gas stream to form an oxygen-depleted gas stream on the retentate side and a gas stream containing oxygen reaction products on the permeate side. The permeate side is purged with the carbon-containing reactive gas stream, and at least a portion of the exhaust gas stream formed from the reaction of the reactive gas stream with the separated oxygen is recirculated to purge the permeate side.

2 Claims, 4 Drawing Sheets

PROCESS FOR REDUCING CARBON PRODUCTION IN SOLID ELECTROLYTE IONIC CONDUCTOR SYSTEMS

CROSS REFERENCE TO RELATED APPLICATION

This patent application is a continuation in part of U.S. patent application Ser. No. 08/880,878, entitled Process for Reducing Carbon Production in Solid Electrolyte Ionic Conductor Systems that was filed on Jun. 23, 1997, now U.S. Pat. No. 5,837,034. U.S. patent application Ser. No. 08/880,878 is incorporated herein by reference in its entirety.

FIELD OF THE INVENTION

The invention relates to an apparatus and process for improving the operation efficiency of solid electrolyte ionic conductor systems and, more particularly, to an apparatus and process for reducing the production and deposition of carbon and/or coke on the permeate side of the oxygen ion transport membrane when a carbon-containing reactive gas stream is used as a purge by employing an exhaust gas recirculation process.

BACKGROUND OF THE INVENTION

Solid electrolyte ionic conductor materials that transport oxygen ions appear to be very useful for the separation of oxygen from gas mixtures, for example, air. Certain of these oxygen ion transport materials are mixed conductors, that is, they conduct both oxygen ions and electrons. At elevated temperatures (generally greater than 450° C.), oxygen ion transport materials contain mobile oxygen ion vacancies that provide conduction sites for selective transport of oxygen ions through the material. The ion transport is driven by the ratio of partial pressures of oxygen across the membrane: oxygen ions flow from the side with high oxygen partial pressure to the side that has a low oxygen partial pressure. Ionization of oxygen to oxygen ions takes place on the "cathode-side" of the membrane and these oxygen ions are transported across the oxygen ion transport membrane. The oxygen ions deionize on the "anode-side" and are released as oxygen molecules. For materials that exhibit only ionic conductivity, external electrodes are placed on the surfaces of the electrolyte and the electronic current is carried in an external circuit in an electrically-driven mode. In contrast, electrons are transported to the cathode internally in mixed conducting materials in a pressure-driven mode, thus completing the circuit and obviating the need for external electrodes. Mixed conductors, however, can also be used in electrically-driven mode, although it is desirable to do so only when the electronic conductivity is limiting.

Owing to their infinite selectivity for oxygen transport, oxygen ion transport materials have several potential uses in the area of air separation and purification of gases. Some applications of these oxygen ion transport membranes involve the use of an anode side reactive purge to improve ion transport-based processes for purification of oxygen-containing gases and for syngas, hydrogen and carbon monoxide production. The basic motivation behind using such a reactive purge is to reduce the oxygen partial pressure on the anode side of the oxygen ion transport membrane greatly by introducing an oxygen scavenging gas (for example, methane, methanol, ethanol, or hydrogen) for purification/separation operations. This reduction in the oxygen partial pressure enhances the pressure-driven oxygen transport through the oxygen ion transport membrane.

In processes where partial oxidation of fuels is desired, such as in syngas generation, employment of an oxygen ion transport membrane can take advantage of the low partial oxygen pressure generated on the anode by an oxygen consuming reaction, such as partial oxidation, to transport oxygen from a relatively low total pressure air stream to a high total pressure reaction site. This avoids a separate air separation plant and expensive compression system.

There are several potential problems with this basic approach. One problem, for example, is that reactively purged oxygen ion transport systems generally must deal with large amounts of heat generated in the oxygen ion transport module. Such heat release leads to undesirable exotherms in the oxygen ion transport module, and may damage its components.

A second difficulty is that all the fuel is introduced at one end of the oxygen ion transport module in a reactive purge process, while the oxygen is incrementally transported through the oxygen ion transport membrane along its entire length. As a consequence, the anode side gas composition is always fuel-rich near the fuel inlet and becomes increasingly fuel-lean as one approaches the other end of the oxygen ion transport module. This occurs irrespective of the overall fuel-to-oxygen ratio used in the oxygen ion transport module. Highly fuel rich operation at the purge inlet end leads to very low gas phase oxygen activity which could lead to corrosion or chemical decomposition of the membrane material. For example, in purification applications such as deoxygenation of oxygen-containing gases, this problem is most pronounced in the "inactive" region of the membrane at the purge inlet end, where no oxygen is transported through the membrane. Also, under some conditions (for example, high temperatures) fuel-rich operation with organic fuels could lead to coke or carbon formation which in turn could lead to fouling the oxygen ion transport membrane surface or the reactor and diminished performance of the oxygen ion transport module.

Similarly when the desired reaction on the anode is partial oxidation, such as in syngas production, unreacted hydrocarbon fuel species will be present on the anode leading to the possibility of solid carbon formation.

Another problem is that high overall fuel-to-oxygen ratios in the oxygen ion transport module will lead to incomplete combustion of the fuel, and cause the outgoing gas to contain species such as hydrogen, carbon monoxide and unreacted fuel which will adversely affect the fuel efficiency. In addition, a highly reactive gas such as hydrogen may be beneficial for effectively scavenging oxygen from the purge side of the oxygen transport membrane. Although hydrogen gas is generally more reactive than most organic fuels, its high cost and scarce availability make its use less desirable than carbon-containing fuels (for example, natural gas). Mazanec et al., U.S. Pat. No. 5,306,411, entitled Solid Multi-Component Membranes, Electrochemical Reactor Components, Electrochemical Reactors and Use of Membranes, Reactor Components, and Reactor for Oxidation Reactions, relates to a number of uses of a solid electrolyte membrane in an electrochemical reactor.

U. Balachandran et al., *Dense Ceramic Membranes for Converting Methane to Syngas*, submitted to the First International Conference on Ceramic Membranes, 188th meeting of the Electrochemical Society, Inc., Chicago, Ill. (Oct. 8–13, 1995), relates to the use of solid electrolyte transport membranes to convert methane to syngas.

E. A. Hazbun, U.S. Pat. No. 4,791,079, entitled Ceramic Membrane for Hydrocarbon Conversion, relates to the use of a solid electrolyte ion transport membrane for oxidizing hydrocarbons and dehydrogenation processes.

T. Nozaki and K. Fujimoto, Oxide Ion Transport for Selective Oxidative Coupling of Methane with New Membrane Reactor, AIChE J., Vol. 40, 870–877 (1994), relates to the oxidative coupling of methane in a solid electrolyte reactor to produce higher hydrocarbons.

H. Nagamoto et al., Methane Oxidation by Oxygen Transported through Solid Electrolyte, J. Catalysis, Vol. 126, 671–673 (1990), relates to the reactions of methane in a solid electrolyte ionic conductor and an analysis of the reaction products.

Prior art related to hydrocarbon conversion by partial oxidation in an ion transport module has been disclosed by ARCO, BP, and Argonne/Amoco (see citations above). In these prior art processes, air typically flows on the cathode side of the oxygen ion transport membrane, whereas a hydrocarbon gas stream is fed to the anode side of the membrane where the hydrocarbons react with oxygen permeating across the oxygen ion transport membrane. These processes, however, do not disclose the use of exhaust gas recirculation to obtain any benefits. In addition, these prior art processes are not intended for inert gas production or purification (for example, to produce nitrogen gas).

Purging of an ion transport membrane with sweep steam is disclosed in Kang et al., U.S. Pat. No. 5,562,754.

A tubular solid-state membrane module is disclosed in Dyer et al., U.S. Pat. No. 5,599,383, having a plurality of tubular membrane units, each unit having a channel-free porous support and a dense mixed conducting oxide layer supported thereon. The porous support of each unit is in flow communication with one or more manifolds or conduits to discharge oxygen which has permeated through the dense layer and the porous support.

OBJECTS OF THE INVENTION

It is therefore an object of the invention to provide an efficient process for inhibiting the deposition of carbon from a carbon-containing reactive gas stream onto the permeate side of an oxygen ion transport membrane.

Another object of the invention is to reduce the amount of heat generated in the oxygen ion transport module which leads to undesirable exotherms in the oxygen ion transport module and may damage its components.

Yet another object of the invention is to introduce fuel gas in such a way as to minimize the concentration gradient along the oxygen ion transport membrane from the fuel inlet to the feed end of the oxygen ion transport module.

It is still another object of the invention to improve the fuel efficiency of the oxygen ion transport module by lowering the fuel-to-oxygen ratios in the oxygen ion transport module which may lead to an incomplete combustion of the fuel and cause the outgoing gas stream to contain species such as hydrogen, carbon monoxide and unreacted fuel.

SUMMARY OF THE INVENTION

The invention comprises a process for inhibiting the formation of carbon and/or coke from a carbon-containing reactive gas stream on the permeate side of an oxygen ion transport membrane and for increasing the equilibrium oxygen activity in the purge gas so as to improve the chemical stability of the oxygen ion transport membrane in the presence of the reactive gas. In the process, a feed gas stream containing elemental oxygen and at least one other gas is separated using an oxygen ion transport module having an oxygen ion transport membrane with a retentate side and a permeate side such that an oxygen-depleted gas stream forms on the retentate side and a gas stream containing reaction products forms on the permeate side. The permeate side of the oxygen ion transport membrane is purged with the carbon-containing reactive gas stream and at least a portion of the exhaust gas stream formed from the reaction of the reactive gas stream with the oxygen gas stream permeating through the oxygen ion transport membrane is recirculated to purge the permeate side of the oxygen ion transport membrane, thereby inhibiting the formation of carbon and/or coke on that side. Exhaust gas recirculation according to the present invention also introduces oxygenated species (for example, carbon dioxide, carbon monoxide, water vapor) into the purge gas which results in significantly increased equilibrium oxygen activity in the purge gas, especially near the purge inlet. Optionally, at least a portion of the exhaust gas stream is passed through a separator to remove carbon dioxide and at least a portion of the carbon dioxide is combined with a recirculating portion of the non-separated exhaust gas stream before it is used to purge the permeate side of the oxygen ion transport membrane. As a further option, the recirculating portion of the carbon dioxide stream from the separator may be used solely, and without contribution from the non-separated exhaust gas stream, to form the recirculating gas stream used to purge the permeate side of the oxygen ion transport membrane.

In a preferred embodiment, the exhaust gas stream exits the oxygen ion transport module before it is recirculated and/or separated. In another preferred embodiment, the feed gas stream is air. In other preferred embodiments, water vapor or steam is added to at least a portion of the recirculated exhaust gas stream before it is used to purge the permeate side of the oxygen ion transport membrane. If water vapor or steam is added to the recirculated exhaust gas stream, another preferred embodiment uses a reformer unit that allows the water vapor and unreacted carbon-containing fuel to form carbon monoxide and hydrogen gas before the reformed gas stream is used to purge the permeate side of the oxygen ion transport membrane. In yet another preferred embodiment, the retentate gas stream is recovered as a nitrogen product. In yet other preferred embodiments, the exhaust gas recirculation is operated to increase the oxygen partial pressure on the permeate side to a desired operating range and/or to maintain the oxygen ion transport module within a preferred range of operating temperatures by mitigating undesirable reaction exotherms.

In yet another embodiment of the invention one or more of the components of the exhaust gas stream, such as carbon dioxide, are separated from the exhaust gas stream prior to recirculation.

BRIEF DESCRIPTION OF THE DRAWINGS

Other objects, features and advantages of the invention will occur to those skilled in the art from the following description of preferred embodiments and the accompanying drawings, in which.

DETAILED DESCRIPTION OF THE INVENTION

The invention involves a configuration allowing the recirculation of a portion of the exhaust gases produced in a reactively purged oxygen ion transport module that employs an oxygen ion transport membrane to separate oxygen from an oxygen-containing gas. This exhaust gas recirculation (EGR) process may mitigate or eliminate many of the potential problems associated with a reactively purged oxygen ion transport module which include sharp exotherms, carbon/coke formation, very low oxygen activity on the purge side (particularly at the purge inlet end) leading to chemical/mechanical instability of the membrane, and low oxygen flux due to slow fuel combustion on the purge side. EGR can also mitigate flow maldistribution problems on the purge side of the oxygen ion transport membrane by increasing the purge side gas flowrate.

Current commercial gas separation/purification processes (for example, pressure swing adsorption—(PSA), thermal swing adsorption—(TSA) or polymeric membrane—based processes) typically operate at temperatures below 100° C., and hence can not take advantage of the combustion products or the thermal energy of the exhaust gases. In contrast, the elevated operating temperatures of oxygen ion transport membranes (usually greater than 450° C.) make the oxygen ion transport process intrinsically well suited for EGR processes.

Multicomponent oxide compositions that exhibit oxygen ion conduction have been developed in the recent years. Such oxygen ion transport materials are potentially useful for separating oxygen from oxygen containing gas streams. The behavior of oxygen ion transport membranes has been extensively studied (for example, for fuel cells).

Reactive purge arrangements are disclosed in Reactive Purge for Solid Electrolyte Membrane Gas Separation, U.S. Pat. No. 5,837,125 and incorporated herein by reference. Preferred configurations for ion transport modules utilizing a reactive purge are disclosed in Solid Electrolyte Ionic Conductor Reactor Design, U.S. Pat. No. 5,820,655 and also incorporated herein by reference. Both patents are commonly owned with the present application.

Figure 1:
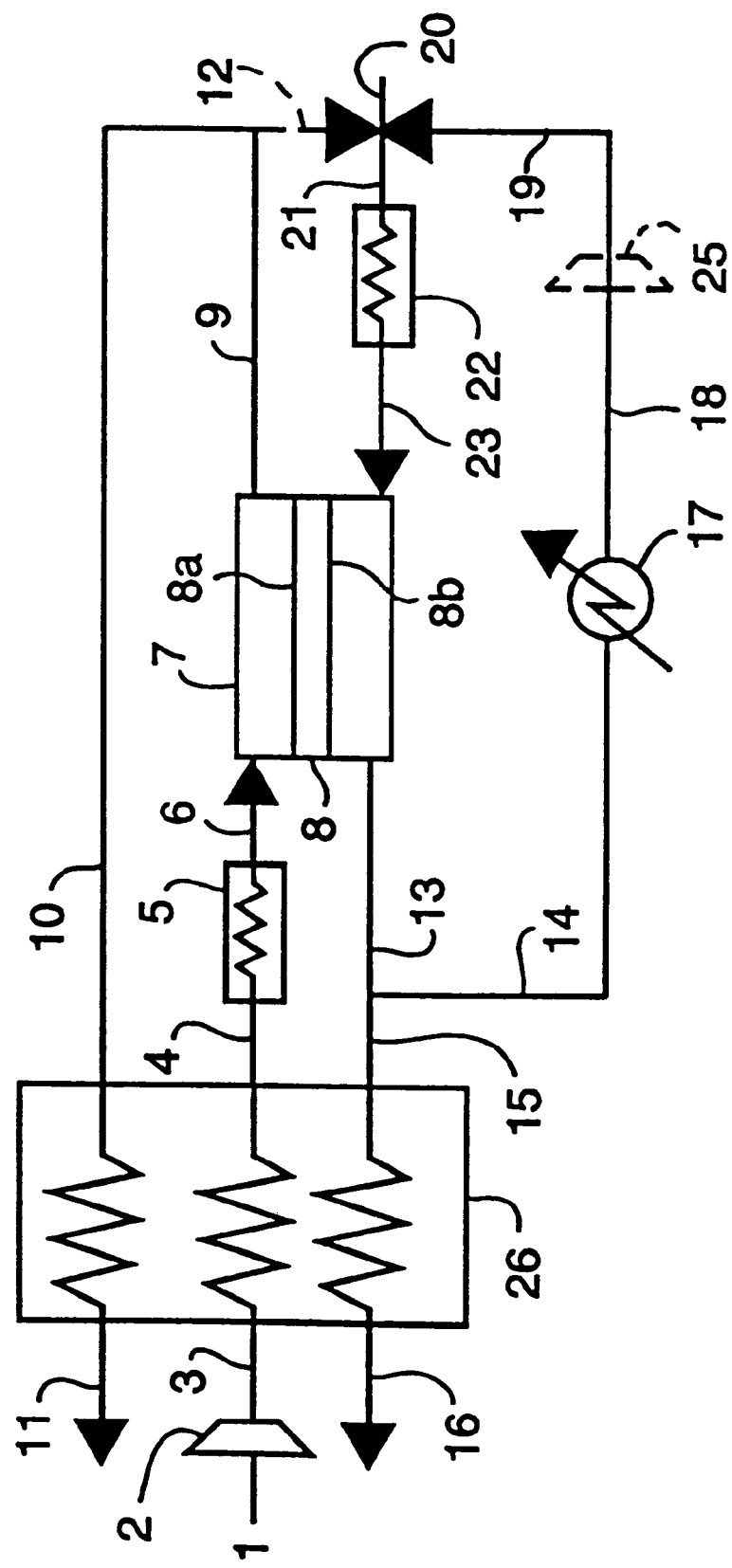
FIG. 1 is a schematic diagram of an embodiment of the invention using the exhaust gas recirculation process with a heat rejection system installed outside of the oxygen ion transport module.

FIG. 1 schematically depicts the configuration for employing EGR in a reactively purged oxygen ion transport process. The invention relates to the recirculation of a portion of the exhaust purge gas stream to the purge inlet to suppress carbon and/or coke formation and improve the performance of the oxygen ion transport module. During operation, oxygen-containing feed gas stream 1 is compressed in blower or compressor 2, to produce compressed feed gas stream 3, and then warmed against the waste or product streams 10 and 15 in heat exchanger 26. The warmed feed gas stream 4 is then optionally heated in heater 5. The hot feed gas stream 6 then enters the feed side of oxygen ion transport module 7 including an oxygen ion transport membrane 8, having retentate side 8a and permeate side 8b. The retentate gas stream 9 is divided into two portions: hot retentate gas stream 10 which may be a waste or a product gas stream and is used in heat exchanger 26, as mentioned above, and as a part of the retentate purge gas stream 12. Stream 10, after giving up heat in heat exchanger 26, is exhausted as waste or product stream 11. Exhaust gas stream 13 exits from the oxygen ion transport module 7 and is divided into two portions: exhaust gas stream 15 and recycle exhaust gas stream 14. Gas stream 15 is used in heat exchanger 26, as mentioned above, to produce gas stream 16 which is discarded as waste (for example, in purification) or is recovered as a product (for example, in syngas production), depending on the application desired.

Exhaust gas stream 14, is optionally cooled using heat rejection unit 17 to form exhaust gas stream 18. The heat rejection unit 17 may involve, for example, a process by which the exhaust gas stream 14 is cooled by water, by adding atomized water to the exhaust gas stream 14, or by bubbling through water. Cooled exhaust gas stream 18 is optionally compressed by optional compressor 25, preferably located downstream from heat rejection unit 17 in the EGR circuit, to make higher-pressure gas stream 19. Gas stream 19 is combined with retentate purge gas stream 12 obtained from the retentate gas stream 9 and reactive gas stream 20 to form purge gas stream 21 which is optionally heated using heater 22 to form purge gas stream 23. Purge gas stream 23 is used to purge the permeate side 8b of oxygen ion transport membrane 8.

Figure 2:
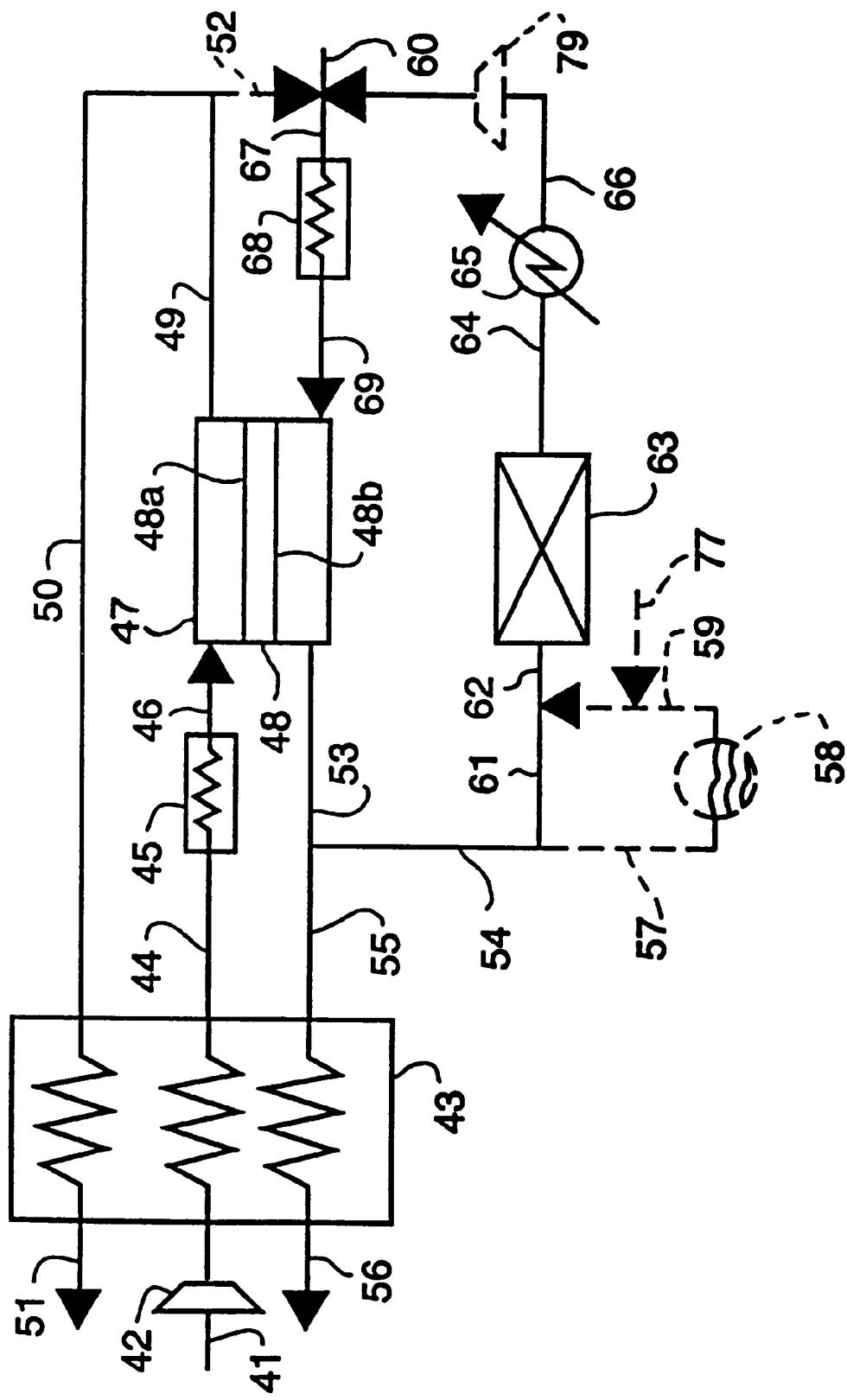
FIG. 2 is a schematic diagram of an embodiment of the invention using the exhaust gas recirculation process similar to FIG. 1 wherein a reformer unit is also used.

FIG. 2 illustrates a modification of the configuration shown in FIG. 1. During operation, oxygen-containing feed gas stream 41 is compressed in blower or compressor 42 and then warmed against the waste or product streams 50 and 55 in heat exchanger 43. The warmed feed gas stream 44 is then optionally heated in heater 45. The hot feed gas stream 46 then enters the feed side of oxygen ion transport module 47 including an oxygen ion transport membrane 48, having retentate side 48a and permeate side 48b. The retentate gas stream 49 is divided into two portions: hot retentate gas stream 50 which may be a waste or a product gas stream and is used in heat exchanger 43, to produce gas stream 51, and retentate purge gas stream 52. Exhaust gas stream 53 exits from the oxygen ion transport module 47 and is divided into two portions: exhaust gas stream 55 and recycle exhaust gas stream 54. Gas stream 55 is used in heat exchanger 43, as mentioned above, to produce gas stream 56 which is discarded as waste (for example, in purification) or is recovered as a product (for example, in syngas production), depending on the application desired. Exhaust gas stream 54, is itself divided into a first gas stream portion 57 and a second gas stream portion 61. The first gas stream portion 57 is passed through saturator 58 where a small amount of steam is added to produce saturated gas stream 59 which is combined with the second gas stream portion 61 to form gas stream 62. Another source of steam or an atomizer can also be used instead of saturator 58 to introduce steam into the exhaust gas stream 54.

Oxygen-containing gas stream 77 containing a small amount of air and/or steam is optionally added to gas stream 59. Gas stream 62 is then passed through partial oxidation/reformer unit 63 (optionally catalytic), where the unreacted organic fuel in gas stream 62 forms carbon monoxide and hydrogen gas and exits as gas stream 64. Here, a partial oxidation/reformer reactor unit is one in which a hydrocarbon reacts with steam or oxygen to produce carbon monoxide and hydrogen gas. The exhaust gas stream 64 may be optionally cooled by heat rejection unit 65 to form exhaust gas stream 66. The heat rejection unit 65 may involve, for example, a process by which the exhaust gas stream 64 is cooled by water, by adding atomized water to the exhaust gas stream 64, or by bubbling through water. Exhaust gas stream 66 is combined with retentate purge gas stream 52 obtained from the retentate gas stream 49 and reactive gas stream 60 to form purge gas stream 67 which is optionally heated using heater 68 to form purge gas stream 69. Purge gas stream 69 is used to purge the permeate side 48b of the oxygen ion transport membrane 48. In another embodiment, gas stream 60 may be optionally heated using heater 68 before mixing with gas streams 52 and 66.

Although the invention as depicted in FIGS. 1 and 2 will work in principle, their practical implementation may be difficult. In FIG. 2, for example, a pressure drop on the permeate side 48b of oxygen ion transport membrane 48 would cause exhaust gas stream 54, and consequently gas stream 66, to be at a lower pressure than gas streams 52 and 60, and recirculation of the exhaust gases would require recompression. Further, in most cases the temperature of exhaust gas stream 54 is relatively high (typically 450° C. to 1100° C.) because of the high temperature of operation of the oxygen ion transport process and because of the heat generated by the exothermic reaction on the permeate side 48b of the oxygen ion transport membrane 48. To use a conventional blower or compressor (for example, units 25 and 79 in FIGS. 1 and 2, respectively) to effect the recirculation, it is necessary to first cool the hot exhaust gas stream 54 (for example, using a heat exchanger or like device) prior to its entry into the compression equipment. This cooling process tends to be disadvantageous both because of the cost of the heat transfer equipment and because the heat lost from the hot exhaust gas stream 54 which could be more desirably used to preheat the inlet purge gas.

Figure 3:
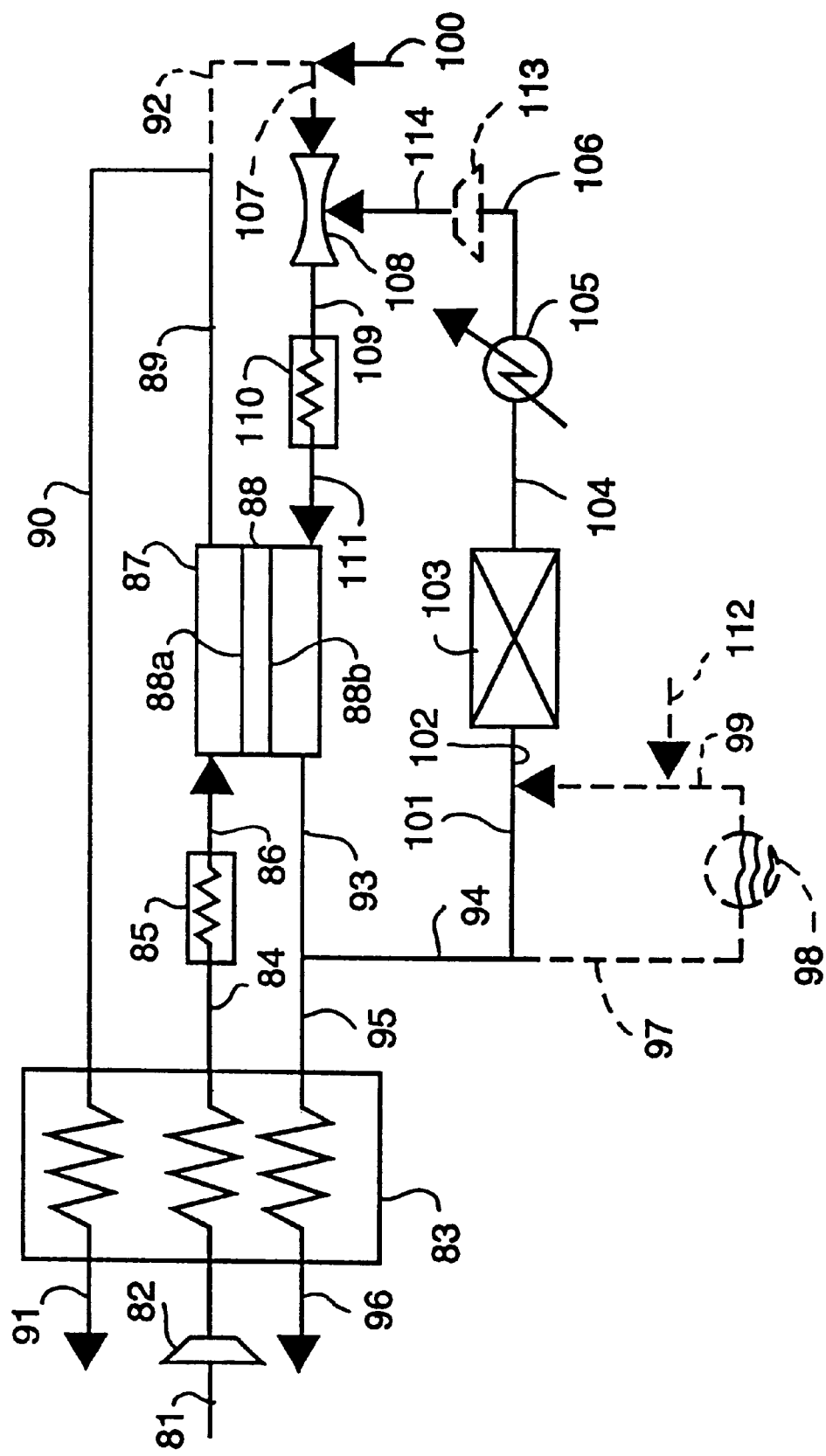
FIG. 3 is a schematic diagram of an embodiment of the invention using the exhaust gas recirculation process similar to FIG. 2, wherein a Venturi eductor is used to recirculate the exhaust gas stream to the oxygen ion transport module.

FIG. 3 shows a method for circumventing these potential problems of FIG. 2 by using Venturi eductor 108. During operation, feed gas stream 81 is compressed in blower or compressor 82 and then warmed against the waste or product streams 90 and 95 in heat exchanger 83. The warmed feed gas stream 84 is then optionally heated in heater 85. The hot feed gas stream 86 then enters the feed side of oxygen ion transport module 87 including an oxygen ion transport membrane 88, having retentate side 88a and permeate side 88b. The retentate gas stream 89 is divided into two portions: hot retentate gas stream 90 which may be a waste or a product gas stream and is used in heat exchanger 83, to produce gas stream 91, and retentate purge gas stream 92.

Exhaust gas stream 93 exits from the oxygen ion transport module 87 and is divided into two portions: exhaust gas stream 95 and recycled exhaust gas stream 94. Exhaust gas stream 95 is used in heat exchanger 83, as mentioned above, to produce gas stream 96 which is discarded as waste (for example, in purification) or is recovered as a product (for example, in syngas production), depending on the application desired. Exhaust gas stream 94, is itself divided into a first gas stream portion 97 and a second gas stream portion 101. The first gas stream portion 97 is passed through saturator 98 where a small amount of steam is added to produce saturated gas stream 99 which is combined with the second gas stream portion 101 to form gas stream 102. Another source of steam or an atomizer can also be used instead of saturator 98 to introduce steam into the exhaust gas stream 94. Gas stream 112 containing a small amount of air and/or steam is optionally added to gas stream 99.

Gas stream 102 is then passed through partial oxidation/ reformer reactor unit 103 (optionally catalytic), where the unreacted organic fuel in gas stream 102 reacts with steam or oxygen to form carbon monoxide and hydrogen gas and exits as gas stream 104. The exhaust gas stream 104 may be optionally cooled by heat rejection unit 105 to form exhaust gas stream 106. The heat rejection unit 105 may involve, for example, a process by which the exhaust gas stream 104 is cooled by water, by adding atomized water to the exhaust gas stream 104, or by bubbling through water. The pressure of stream 106 optionally is increased by a compressor 113, shown in phantom, to produce stream 114.

Retentate purge gas stream 92 obtained from the retentate gas stream 89 and high pressure reactive gas stream 100 are combined to form gas stream 107. Gas stream 107 is a high pressure driver gas stream and is passed through a Venturi nozzle to create a low static pressure region at the throat of the Venturi eductor 108. The exhaust gas stream to be recirculated is introduced into the low pressure region at the throat of Venturi eductor 108. By using a sufficient pressure and/or flowrate of the driver gas stream, it is possible to achieve the desired recirculation rate of the exhaust gas stream 94.

There are many advantages of employing a Venturi eductor to effect the exhaust gas recirculation process. For example, Venturi eductors are simple devices as they have no moving parts, and are inexpensive and rugged as compared to traditional compression equipment. In addition, Venturi eductors can recirculate the hot exhaust gas stream, thus eliminating the need for cooling heat transfer equipment. Thus, optional heat rejection units 17, 65, and 105 in FIGS. 1, 2 and 3, respectively, are eliminated in some constructions. The hot recirculated exhaust gas can also be used to beneficially preheat the inlet purge gas stream. Using the Venturi eductor, exhaust gas stream 106 is thereby combined with gas stream 107 to form gas stream 109 which is optionally heated using heater 110 to form purge gas stream 111. Purge gas stream 111 is then used to purge the permeate side 88b of the oxygen ion transport membrane 88. A similar variation using a Venturi eductor can be adapted for the embodiment of FIG. 1.

In the embodiments discussed above, a part of the purge side combustion products can also be recirculated and mixed with purge gas streams 23, 69, and 111 internally and still achieve the benefits outlined above. For example, natural or forced convection can be effected on the purge side to induce mixing. Also, the incoming purge gas streams 23, 69, and 111 can be brought in at high pressure/velocity to form swirling jets and thus bring about mixing of the combustion products. In general, it is desirable to maintain cocurrency/ countercurrency of feed and purge streams near the high purity product end in deoxo systems. Recirculation coupled with fast surface reactions on the surface of the oxygen ion transport membrane or on an external catalyst on the purge side, however, may also help achieve the same end.

Figure 4:
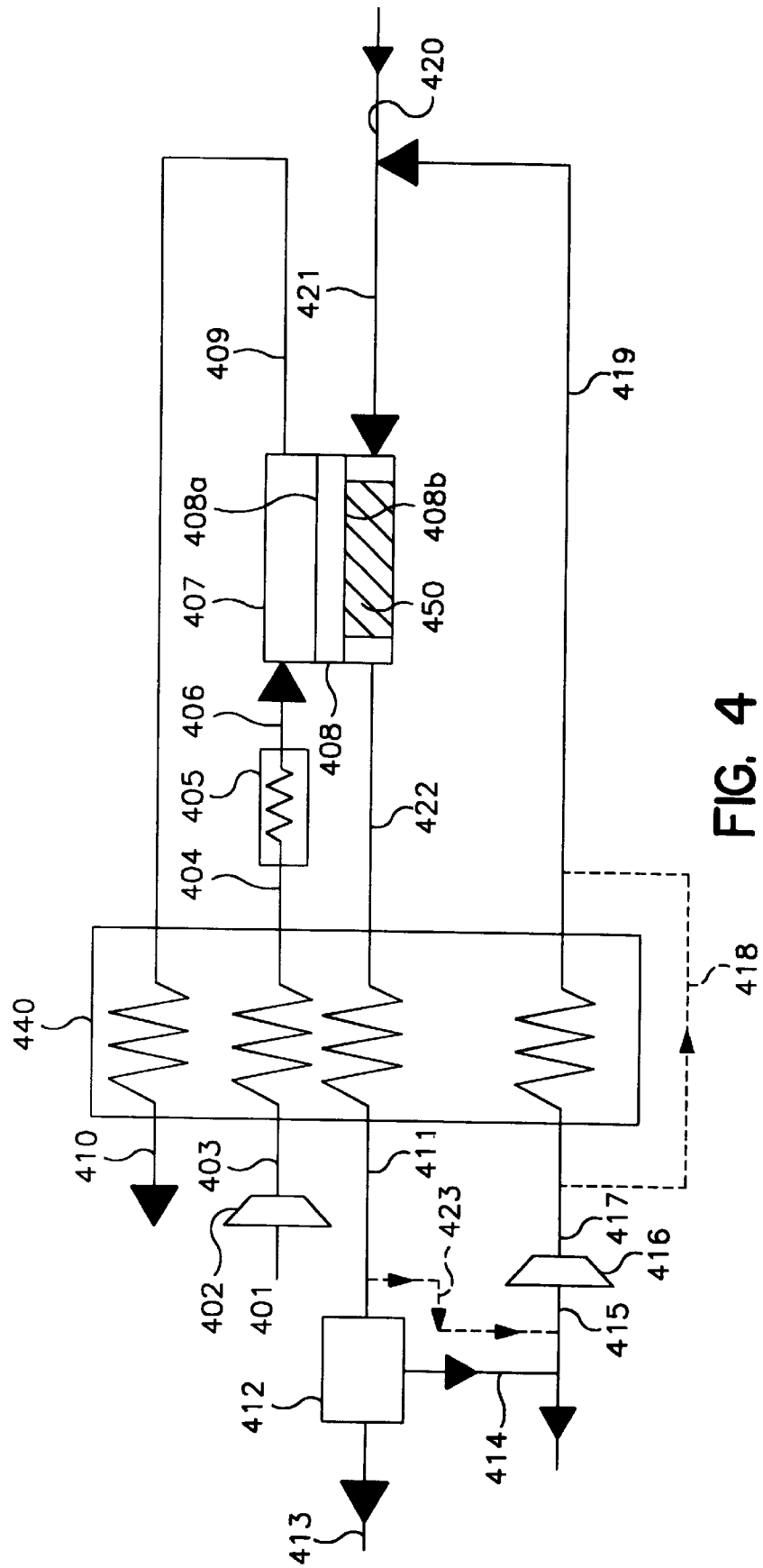
FIG. 4 is a schematic diagram of an embodiment of the invention in which carbon dioxide is separated from the exhaust gas stream after cooling and recirculated to the anode side of the oxygen ion transport module.

FIG. 4 shows an embodiment of the invention in which carbon dioxide is separated from the exhaust gas stream and recirculated to inhibit the formation of carbon on the anode side of the oxygen ion transport module. Air 401 is compressed in compressor 402 to a moderate pressure, heated in heat exchanger 440, recovering heat from retentate stream 409 and product stream 422, and becomes heated compressed stream 404. Stream 404 is optionally further heated by heater 405. Air, then as stream 406, enters the cathode side 408a of oxygen ion transport membrane 408 of ion transport module 407. A portion or most of the oxygen contained in the air stream is permeated to the anode side 408b of oxygen ion transport module 407 by pressure driven ion transport and reacts with the fuel fed to the anode side with feed stream 421 in a partial or complete oxidation reaction.

The retentate stream 409 exiting the oxygen ion transport module 407 is discharged from the system after recovery of contained heat in heat exchanger 440 either as a waste stream 410 or as nitrogen product. The permeate stream 422, containing reaction products such as carbon monoxide, hydrogen, carbon dioxide, steam and some unreacted fuel, exits the anode side 408b of oxygen ion transport module 407, is cooled in exchanger 440 and then flows to a separator 412, in which at least a portion of one or more of the reaction products, such as carbon dioxide, are removed from exhaust stream 411. For carbon dioxide removal, separator 412 may be a polymeric membrane separator, a hot carbonate wash system, an ethanolamine absorption system or another suitable $CO_2$ removal system as would be apparent to those of skill in the art.

Optionally, at least a portion of the exhaust stream 411 bypasses separator 412 via bypass stream 423 and is added to the separated carbon dioxide stream for recirculation. In syngas production this has the advantage of adding some hydrogen at the entrance of the oxygen ion transport module, which increases the reactivity of feed stream 421 in the oxygen ion transport module 407. Separator 412 separates at least part of the contained carbon dioxide from stream 411, to produce stream 413 and stream 414 comprising carbon dioxide. At least a portion of the separated carbon dioxide 414, and optionally bypass stream 423 forms stream 415 and, is recompressed in compressor 416 to form compressed recirculation stream 417 Stream 417, optionally heated in exchanger 440, or partially or totally by-pass heat exchanger 440 as stream 418. The resulting stream 419 mixed with fuel stream 420, and optionally steam, and introduced to the anode side 408b of oxygen ion transport reactor 407 as a purge gas stream. If the desired product of the reaction is syngas a suitable catalyst 450, such as nickel on alumina supports, may be added into the permeate passage of oxygen ion transport module 407.

The advantages of the invention, as illustrated in the embodiments shown, are numerous and diverse. For example, by recirculating the exhaust gas stream, it is possible to introduce water and carbon dioxide in the inlet purge, along with the fuel or reactive gas stream. The presence of water in particular and to a lesser extent carbon dioxide can diminish or suppress coke formation.

In addition, it should be noted that, although low oxygen partial pressures on the purge side gives rise to high oxygen fluxes, many oxygen ion transport materials are unstable under very highly reducing conditions (for example, when the oxygen partial pressure is less than $10^{-16}$ atm). Certain embodiments of the invention, by introducing oxygen containing compounds such as water, carbon monoxide, and carbon dioxide in the purge stream, increase the equilibrium oxygen activity on the purge side of the oxygen ion transport membrane (especially near the inlet) to a desired operating range, thus preventing degradation of the oxygen ion transport membrane.

It should also be noted that if excess heat is generated in the oxygen ion transport module, it must be removed somewhere in the process configuration. In the embodiments shown, the exhaust gas stream is cooled outside the oxygen ion transport module, thus simplifying the heat rejection process. Moreover, passing a portion of the exhaust gas recirculation stream through a saturator will cool the exhaust gas stream to some extent, thus providing control over the temperature of the stream entering the reformer unit. For the purpose of the present invention, the saturator is any device where a portion of the thermal energy in the exhaust gas recirculation stream is used to vaporize water.

Furthermore, the temperature of the purge gas stream can be controlled by adjusting the relative amounts of the recirculated exhaust gas stream and the retentate gas stream, thus giving a positive means for temperature control in the oxygen ion transport module. In many instances, the purge gas stream exit temperature from a reactively purged process will be higher than the purge gas stream inlet temperature. In such cases, the exhaust gas recirculation process would reduce the heating requirements for the purge gas stream, which in turn could reduce or eliminate heat exchanger requirements for the purge gas stream.

In addition, the exhaust gas stream can be cooled by bubbling the exhaust gases through water to form steam and this steam, or a portion thereof, can be returned to the oxygen ion transport module to mix with the purge gas stream. Addition of steam to the purge gases will enhance reforming (which is endothermic) of the reactive gas stream which decreases the undesirable exotherms in the oxygen ion transport module. In some situations, the presence of water vapor in the purge gas stream will facilitate combustion of the reactive gas stream and the addition of steam to the purge gas stream will also reduce the retentate gas purge requirement. The presence of steam in the EGR stream entering the partial oxidation/reformer unit will aid the reactions taking place there and because the EGR gases are already hot, they will be sufficiently preheated for partial oxidation/reforming. Although it is possible to employ a catalyst inside an oxygen ion transport module, it may make the design of the oxygen ion transport module difficult. The embodiment of the invention shown in FIG. 2 circumvents such problems by installing a catalytic partial oxidation/reformer unit outside the oxygen ion transport module, but still accruing the same benefits of a catalyst.

It should be noted that if the fuel or reactive gas stream is incompletely combusted, the exhaust gas stream will contain combustible species such as hydrogen gas, carbon monoxide, and hydrocarbons. The exhaust gas recirculation process provides a way to recycle some of the combustibles and thereby improve the overall fuel efficiency. Furthermore, when hydrogen gas is present in the exhaust gas stream, EGR will result in hydrogen gas being introduced with the purge gas stream. Even a small amount of hydrogen gas generated in the partial oxidation/reformer unit may enhance the performance of the reactive purge gas substantially because of the following benefits of hydrogen gas as used in the invention: hydrogen gas is much more reactive than most other gaseous fuels and will consume oxygen on the purge side of the oxygen ion transport membrane; hydrogen gas diffuses faster than most gases, and will reach the oxygen ion transport membrane surface and scavenge oxygen permeating through the oxygen ion transport membrane more effectively, thereby improving the oxygen flux to the purge side; and hydrogen gas combustion will generate heat locally, which will aid the oxidation of the organic fuel species. Although hydrogen itself could be used as the purge gas, it may be uneconomical to do so. The present invention may generate hydrogen gas from the unreacted reactive gas stream, thereby minimizing fuel waste, and also offers other benefits of using hydrogen outlined above.

The EGR process also reduces the need for external diluent in the purge inlet stream and this is particularly valuable in instances where the only other diluent stream available is the product gas stream. The schemes discussed here will find applications in most reactively purged oxygen ion transport systems, for example, oxygen ion transport-based deoxo for gas purification applications. In addition, oxygen ion sport-based syngas/$CO/H_2$ production with EGR will be benefited by catalytic reforming of the unreacted fuel taking place outside the oxygen ion transport module, the presence of hydrogen and carbon monoxide in the purge stream that assists the purge side reactions, and the heat rejection outside the oxygen ion transport module.

For the purpose of illustration in the following Examples, methane is used as the fuel. Any gas phase carbonaceous fuel, however, may be used in the oxygen ion transport module.

EXAMPLE 1

Effect of the equivalence ratio $\phi$ on the equilibrium gas composition (mole fractions) in a methane-oxygen mixture at 1000° C. and 1 atm is shown in Table I. $\phi$ is defined as follows: $\phi=2\times$[amount of methane]/[amount of oxygen] in the initial methane-oxygen mixture.

TABLE I

Equilibrium composition of the purge out gas in an oxygen ion transport module without EGR.

| $\phi$ | $H_2$ (g) | CO (g) | $H_2O$ (g) | $CO_2$ (g) | Carbon (s) | $CH_4$ (g) | $p_{O2}$ (atm) |
|---|---|---|---|---|---|---|---|
| 1 | 0 | 0 | 0.67 | 0.33 | 0 | 0 | 1.0E-06 |
| 1.1 | 0.07 | 0.05 | 0.6 | 0.28 | 0 | 0 | 2.2E-13 |
| 2 | 0.42 | 0.24 | 0.24 | 0.09 | 0 | 0 | 9.9E-16 |
| 3 | 0.58 | 0.31 | 0.08 | 0.03 | 0 | 0 | 6.1E-17 |
| 4 | 0.66 | 0.33 | 0 | 0 | 0 | 0 | 5.4E-20 |
| 4.1 | 0.66 | 0.32 | 0 | 0 | 0.01 | 0 | 4.5E-20 |
| 5 | 0.66 | 0.27 | 0 | 0 | 0.07 | 0 | 3.4E-20 |

This example illustrates one of the advantages to be gained by using the exhaust gas recirculation process. Generally, the oxygen ion transport module will operate under fuel rich conditions: thus at typical values of the overall equivalence ratio $\phi$ (for example, $\phi$ greater than 1), carbon monoxide and hydrogen will be formed at chemical equilibrium. By recirculating a part of the exhaust, these fast combusting components can be added to the purge side, thereby enhancing oxygen ion transport performance. It also shows that at high values of $\phi$ (for example, $\phi$ greater than 4), carbon formation would occur in a reactively purged oxygen ion transport module. Even when the overall equivalence ratio in the oxygen ion transport module is less than 4, $\phi$ will be much higher near purge entry, causing carbon to be formed. As discussed earlier, carbon formation could be detrimental to the performance of the oxygen ion transport module. The results in Table I also show that the equilibrium oxygen partial pressure is very low under fuel rich condition being in $10^{-20}$ for $\phi$ greater than 4. EGR will greatly increase the oxygen partial pressure of the purge stream by adding oxygenated species to the purge gas and this in turn will mitigate chemical stability problems of the membrane.

In an oxygen ion transport module where chemical equilibrium may not be achieved, some unburnt fuel (methane) will be left over, and EGR will increase the fuel efficiency of the oxygen ion transport module.

EXAMPLE 2

For a fixed ratio a, the effect of the recirculation ratio $\xi$ on carbon formation is shown in Table II. The variables $\alpha$ and $\xi$ are defined as follows, with reference numerals from FIG. 1:

$\alpha$=[amount of methane in the purge gas stream 20]/[amount of oxygen separated in the oxygen ion transport module 7]

$\xi$=[flowrate of recirculated exhaust gas stream 14]/[ratio of unrecirculated purge stream 16].

Note that in this example, no reformer unit is used and no portion of the product is recirculated. Also, the oxygen ion transport module is assumed to operate isothermally at 1000° C. and the purge side is at 1 atm, and gas streams 14 and 16 are assumed to be at chemical equilibrium under those conditions. Here, $\alpha$=2.5 for each case in Table II. At $\xi$=0, this case corresponds to $\xi$=5 in Example 1, that is, without EGR.

TABLE II

Equilibrium composition of the purge out gas streams 14/16 in an oxygen ion transport module with EGR. (Note: $\xi$ = 0 corresponds to a case without EGR.)

| $\xi$ | $H_2$ (g) | CO (g) | $H_2O$ (g) | $CO_2$ (g) | Carbon (s) | $CH_4$ (g) | $p_{O2}$ (atm) |
|---|---|---|---|---|---|---|---|
| 0 | 0.66 | 0.27 | 0 | 0 | 0.07 | 0 | 3.4E-20 |
| 0.2 | 0.66 | 0.33 | 0 | 0 | 0 | 0 | 7.6E-20 |
| 0.41 | 0.63 | 0.32 | 0.03 | 0.01 | 0 | 0 | 8.3E-18 |
| 0.49 | 0.62 | 0.32 | 0.04 | 0.01 | 0 | 0 | 1.5E-17 |
| 0.61 | 0.61 | 0.32 | 0.06 | 0.02 | 0 | 0 | 2.5E-17 |
| 0.69 | 0.6 | 0.31 | 0.06 | 0.02 | 0 | 0 | 3.2E-17 |
| 0.82 | 0.59 | 0.31 | 0.07 | 0.02 | 0 | 0 | 4.4E-17 |
| 1.5 | 0.56 | 0.3 | 0.1 | 0.04 | 0 | 0 | 1.0E-16 |
| 2.03 | 0.55 | 0.29 | 0.12 | 0.04 | 0 | 0 | 1.4E-16 |
| 3 | 0.53 | 0.29 | 0.13 | 0.05 | 0 | 0 | 1.9E-16 |
| 4 | 0.52 | 0.28 | 0.14 | 0.05 | 0 | 0 | 2.2E-16 |
| 5.25 | 0.52 | 0.28 | 0.15 | 0.05 | 0 | 0 | 2.5E-16 |
| 9 | 0.51 | 0.28 | 0.16 | 0.06 | 0 | 0 | 3.0E-16 |
| 11.5 | 0.5 | 0.28 | 0.16 | 0.06 | 0 | 0 | 3.1E-16 |

Table II illustrates that even at the small recirculation ratio $\xi$ of 0.2, carbon formation in the oxygen ion transport module can be substantially eliminated. It should be noted that if chemical equilibrium is not reached, the oxygen partial pressure of the purge stream may be substantially lower than $10^{-16}$ atm. From Table II, it can be seen that the mole fraction of hydrogen gas in the purge out gas streams 14 and 16 decreases as the recirculation ratio increases. At the same time, however, the fraction of hydrogen gas added to purge in gas stream 14 increases. As discussed above, this will be beneficial to operation of the oxygen ion transport module. For example, in an oxygen ion transport deoxo gas purification unit with a countercurrent flow configuration, purge inlet and product are the same end of the oxygen ion transport module. The outgoing product will typically have a very small amount of oxygen. The presence of hydrogen gas in gas stream 14 will ensure efficient fuel oxidation near the purge inlet, thereby creating the necessary driving force for oxygen transport across the membrane and help achieve the desired purification of the product.

It is apparent from the results shown in Table II that EGR results in greatly increased oxygen partial pressure in the purge stream. For example, the oxygen partial pressure is increased from $10^{-20}$ atm without EGR ($\xi$=0) to $10^{-16}$ atm using EGR with $\xi$=1.50. This will make it much easier to ensure the chemical and mechanical stability of the oxygen ion transport membrane material, particularly at the fuel inlet and in the "inactive" region of the oxygen ion transport module when there is no oxygen permeating through the membrane.

Also note that as the recirculation ratio increases, the fraction of water and carbon dioxide in the recirculated exhaust gas stream 14 increases. This helps reduce carbon formation in the oxygen ion transport module.

Typical ranges for operating parameters of the oxygen ion transport module are as follows:

Temperature: Typically in the 400–1200° C. range, and preferably in the 400–1000° C. range.

Pressure: The purge side pressure will be typically in the 1 to 100 atm range. The feed side pressure will be 1 to 100 atm.

Oxygen ion conductivity ($\sigma_i$) of the oxygen ion transport membrane: Typically in the 0.01 to 100 S/cm range (1 S=1/ohm).

Thickness of the oxygen ion transport membrane: Oxygen ion transport membranes can be employed in the form of a dense film, or a thin film supported on a porous substrate. The thickness (t) of the oxygen ion transport membrane/layer will typically be less than 5000 microns; preferably less than 1000 microns, and most preferably less than 100 microns.

Membrane configuration: The oxygen ion transport membrane elements may be tubular or planar, or monolithic modules with provisions for gas passage.

Gas flow pattern: Although countercurrent gas flow configuration is shown in the figure, cocurrent, crossflow and other configurations may be used in the oxygen ion transport module.

Purge and recirculation ratios: The purge ratio $\alpha$ will be typically 0.05 to 10, and preferably 0.1 to 5. The recirculation ratio $\xi$ will be typically 0 to 10, and preferably 0.05 to 5.

Key modifications of the basic EGR concept have been described above. Other modifications include internal recirculation (for example, a natural convection oxygen ion transport module) to provide some of the benefits of EGR. One could also add steam, carbon dioxide or other easily available oxygen-containing compounds separately to purge inlet, however, this option is less attractive.

Although pressure-driven systems are preferred for the simplicity of their design, the EGR concepts described herein are applicable to electrically-driven systems as well. Electrically-driven systems are described in more detail in Prasad et al., U.S. Pat. No. 5,547,494, entitled Staged Electrolyte Membrane, which is hereby incorporated by reference to more fully describe the state of the art. This patent also discloses a control system having oxygen sensors and flow meters; a similar system using flow, oxygen and/or temperature sensors may be used to control temperature and/or oxygen partial pressure according to the present invention by adjusting one or more valves (not shown) in the EGR circuit.

As mentioned above, the term "solid electrolyte ionic conductor", "solid electrolyte", "ion conductor", "oxygen ion transport membrane" or "ion transport membrane" is generally used herein to designate either an ionic-type (electrically-driven) or a mixed conductor-type (pressure-driven) system or material capable of oxygen-ion transport, unless otherwise specified.

The term "nitrogen" as used herein will usually mean oxygen-depleted gas, that is, oxygen-depleted relative to the feed gas. As discussed above, the oxygen ion transport membrane only allows oxygen ion transport. Therefore, the composition of the retentate will depend on the composition of the feed gas. The feed gas will be depleted of oxygen but will retain nitrogen and any other gases (for example, argon) present in the feed gas. The meaning of the term will be clear to one of skill in the art in the context of the use of the term in light of the invention as disclosed herein.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

The term "carbon-containing reactive gas stream" means a gas stream that may include hydrocarbons (for example, methane), other combustible organic compounds (for example, methanol, ethanol), carbon monoxide, and powdered carbon (that is, coke). The term is meant to comprehend any carbon-containing compound that reacts with elemental oxygen, that is, any carbon-containing compound that undergoes combustion.

The term "high purity" refers to a product stream which contains less than five percent by volume of undesired gases. Preferably the product is at least 98.0% pure, more preferably 99.9% pure, and most preferably at least 99.99% pure, where "pure" indicates an absence of undesired gases.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

What is claimed is:

1. A process for inhibiting the formation of carbon and/or coke from a carbon-containing reactive gas stream on the permeate side of an oxygen ion transport membrane, the process comprising:

separating a feed gas stream containing elemental oxygen and at least one other gas using an oxygen ion transport module having an oxygen ion transport membrane with a retentate side and a permeate side such that an oxygen depleted gas stream forms on the retentate side and a gas stream containing reaction products forms on the permeate side;

purging the permeate side of the oxygen ion transport membrane with the carbon-containing reactive gas stream;

recirculating at least a portion of an exhaust gas stream formed from the reaction of the reactive gas stream with the oxygen gas stream permeated through the oxygen ion transport membrane to purge the permeate side of the oxygen ion transport membrane; and passing at least a portion of the exhaust gas stream through a separator to remove carbon dioxide and combining at least a portion of the carbon dioxide with a recirculating portion of the non-separated exhaust gas stream before it is used to purge the permeate side of the oxygen ion transport membrane to form the recirculating gas stream used to purge the permeate side of the oxygen ion transport membrane, thereby inhibiting the formation of carbon and/or coke thereon.

2. A process for inhibiting the formation of carbon and/or coke from a carbon-containing reactive gas stream on the permeate side of an oxygen ion transport membrane, the process comprising:

separating a feed gas stream containing elemental oxygen and at least one other gas using an oxygen ion transport module having an oxygen ion transport membrane with a retentate side and a permeate side such that an oxygen depleted gas stream forms on the retentate side and a gas stream containing reaction products forms on the permeate side;

purging the permeate side of the oxygen ion transport membrane with the carbon-containing reactive gas stream;

recirculating at least a portion of an exhaust gas stream formed from the reaction of the reactive gas stream with the oxygen gas stream permeated through the oxygen ion transport membrane to purge the permeate side of the oxygen ion transport membrane; and passing at least a portion of the exhaust gas stream through a separator to remove carbon dioxide and using at least a portion of the carbon dioxide to form the recirculating gas stream used to purge the permeate side of the oxygen ion transport membrane, thereby inhibiting the formation of carbon and/or coke thereon.

* * * * *